Dec. 25, 1956  H. L. WILSON ET AL  2,775,537
DOUBLE CEMENTS FOR BONDING DISSIMILAR RUBBERY MATERIALS
Filed April 29, 1952
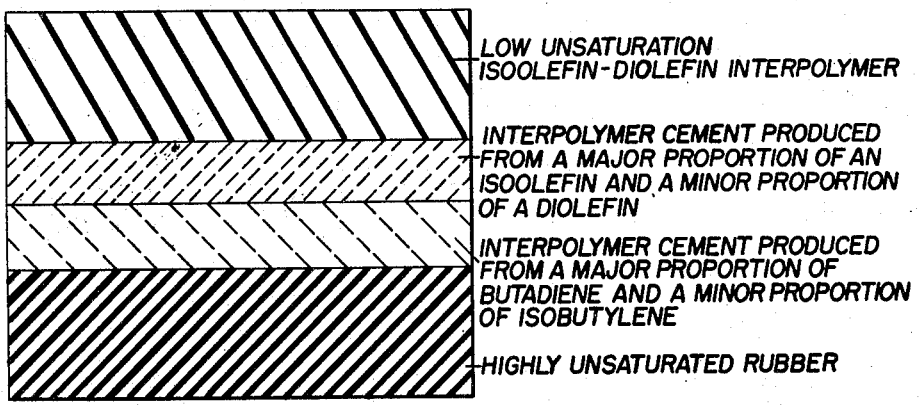
Howard L. Wilson
Samuel B. Robison   Inventors
Winthrope C. Smith
Small, Dunham and Thomas
By L. F. Manx   Attorney

United States Patent Office 2,775,537
Patented Dec. 25, 1956

2,775,537

DOUBLE CEMENTS FOR BONDING DISSIMILAR RUBBERY MATERIALS

Howard L. Wilson, Raritan Township, Union County, and Samuel B. Robison and Winthrope C. Smith, Westfield, N. J., assignors to Esso Research and Engineering Company, a corporation of Delaware Application April 29, 1952, Serial No. 285,071

12 Claims. (Cl. 154—140)

This invention pertains to novel double cements and preparation thereof, and to special uses of these double cements for bonding together dissimilar polymer compounds and to the bonded and plied articles produced thereby.

In a variety of operations to produce plastic, rubbery, and/or elastic type structures, it is frequently desirable to make one portion of the article from one kind of plastic or rubbery material, and the other portion from some other kind of plastic or rubbery substance; hence, it becomes necessary that these two different compositions should be firmly bonded to each other. It is of particularly great importance to bond together chemically dissimilar rubbery materials.

As a specific example of this type of bond between dissimilar rubbery materials, in the production of pneumatic tires containing more than one polymer type, it is necessary to form an adequate and firm bond between treads or sidewalls prepared from relatively low unsaturation isoolefin-multiolefin copolymers and the more highly unsaturated rubbery materials such as the diene-styrene copolymers, diene-nitrile copolymers, and natural rubber, as well as other unsaturated polymers and mixtures of such rubbery materials from which the carcass is prepared.

However, natural rubber, rubber substitutes, and the various synthetic rubbery materials differ so greatly in their chemical and physical properties and in their respective reactions to compounding, filling, and vulcanizing agents, and processes generally, that it is difficult to get dissimilar plastic and/or rubbery substances to bond together in a firm union, joint, or weld. The adhesion may be negligible or the bond formed may be too weak to be useful. A further difficulty is the phenomenon known as "skating." When this occurs, there is some adhesion shown at the onset of separation and then the bond separates very easily at much lower adhesions while separation continues further along the bond, particularly if the rate of separation is accelerated.

Although many attempts have been made to prepare cements particularly adapted for the above described purpose from commercially available materials, the previously made cements or tie gums have always proved to be inadequate.

For instance, it has been known to use mixtures of the respective rubber-like compounds which are to be plied or combined together, and some kinds of rubbers are readily united in this way. However, mixtures of natural rubber with the low unsaturation, isoolefin-diolefin interpolymers are of relatively low physical strength, and while such a mixed ply will serve for some purposes, the strength is undesirably low for other purposes, especially for the attaching of a low unsaturation, isoolefin-diolefin copolymer tread to a rubber tire carcass compounded from natural rubber or diene-styrene polymers or admixtures thereof, having relatively higher unsaturation.

The invention overcomes the abovementioned disadvantages as will be apparent from the following description wherein reference will be made to the drawing in which the single figure is a sectional view of a structure illustrating, in a self-explanatory manner, a practical application of the invention, facilitating an understanding thereof.

The present invention uses novel double cements as tie gums to bond together unlike rubbery, plastic, or elastic materials. These new double cements or tie gums are especially useful for bonding together layers or portions of natural rubber or the more highly unsaturated synthetic rubbers and the isoolefin-diolefin low temperature interpolymers, which have relatively low unsaturation.

These double cements have been found to give effective bonds between high and low unsaturation rubbery materials. One type uses a gradation of unsaturation of isobutylene-butadiene copolymer between the two different types of polymer. As an alternative type of double cement, either isobutylene-isoprene copolymer of high unsaturation or dimethyl butadiene-isobutylene copolymer is applied to the low unsaturation material.

The cements are prepared from Friedel-Crafts catalyzed polymerizations of isobutylene and a diolefin at low temperatures. The cement for application on the low unsaturation material is prepared from a feed composed of isobutylene and a diolefin having from 4 to 6 carbon atoms such as isoprene or dimethylbutadiene in ratios of 20 to 100 parts of diolefin per 100 parts of isobutylene by weight. The unsaturation should be above an iodine number of 50 by Wijs method. The cement for application on highly unsaturated hydrocarbon polymers should be prepared from isobutylene copolymer with butadiene by Friedel-Crafts catalyzed low temperature polymerization. This copolymer is prepared from feed mixtures having 400 to 750 parts of butadiene per 100 parts of isobutylene and must have an unsaturation of not less than 30 iodine number (Wijs method). The double cements can have a number of different filler and vulcanization ingredient combinations without exceeding the scope of the invention.

One synthetic rubber-like substance which has found wide commercial use is the low-unsaturation interpolymer of a major proportion of an isoolefin and a minor proportion of a diolefin, particularly isobutylene with a diolefin having 4 to 8 carbon atoms such as butadiene, isoprene, the pentadienes, the methyl pentadienes, or dimethyl butadiene, the interpolymer being prepared by mixing the isoolefin and diolefin at a low temperature, and polymerizing the mixture to produce polymers having Staudinger molecular weights in excess of 20,000 and molecular weights preferably ranging between 30,000 and 150,000. These interpolymers may be made as described in U. S. 2,356,128.

Other valuable synthetic rubber-like polymers are those of dienes such as butadiene, or butadiene with acrylonitrile or butadiene with styrene as are produced by emulsion polymerization. These polymers have Wijs iodine numbers ranging up to about 451 in contrast to the isoolefin-diolefin polymer above described which normally has a Wijs iodine number within the range of 1 to about 40 or 50.

These synthetic polymers as well as natural rubber can be cured by heating with sulfur, especially in the presence of specific organic accelerators which act as vulcanization aids. However, the conditions for curing the various polymers and rubbery materials differ a great deal. In particular, the rate of cure and curing temperatures of the low unsaturation isoolefin-diolefin interpolymer differ widely from those of natural rubber, and from the emulsion polymerizates which more closely resemble natural rubber. Accordingly, the entire processes for the cure of these polymers, and for the vulcanization of rubber are quite different, and attempts to cause bodies of the respective materials to adhere by curing them in simple contact do not give useful bonds.

Sulfur bridges are formed during vulcanization. These may occur between molecules or between points of unsaturation in the same molecule. Natural rubber, for example, is considered as 100% unsaturated while isoolefin-diolefin copolymers have unsaturation of the order of 1.5%. A sulfur molecule would thus be more likely to form an intra- and/or inter-molecular linkage with natural rubber than cross-link between the natural rubber and copolymer molecules to form a stable bond. Furthermore, the solubility of sulfur is of the order of three times more in natural rubber than in isoolefin-diolefin copolymers.

Bonds are produced by the present invention by application of one kind of cement to the low unsaturation isoolefin-diolefin copolymer which cement may be either isobutylene-butadiene copolymer of low unsaturation or isobutylene-isoprene copolymer of higher unsaturation or an isobutylene-dimethyl butadiene copolymer. Another cement made from isobutylene-butadiene copolymer of higher unsaturation is applied to the more highly unsaturated materials such as natural rubber and the diene-nitrile copolymers. The bonds so produced, show excellent adhesion as high as 40–50 lbs. per linear inch. In many cases, there is a tearing of the polymer stock rather than any break occurring in the cement bond.

For bonding cement to be applied to the low unsaturation isoolefin-diolefin copolymers, there may be used, for example, a copolymer made from a feed containing from 29 to 100 parts of isoprene per 100 parts of isobutylene or from a feed containing from 100 to 400 parts of butadiene per 100 parts of isobutylene. The cement to be applied to the more highly unsaturated materials is preferably a copolymer prepared from a feed containing 400 to 750 parts of butadiene per 100 parts of isobutylene.

The procedure for preparing the polymers employed for the cements consists in preparing a suitable mixture of an isoolefin such as isobutylene with a diolefin having 4 to 6 carbon atoms; suitable diolefins for the cement compositions being butadiene, isoprene, dimethylbutadiene, or some other conjugated diolefin. The mixture of appropriate olefins is then cooled to a relatively low temperature preferably below 0° C. and in a temperature range of 0° C. to −164° C., and preferably by the application to the mixture of a refrigerant such as solid carbon dioxide, or liquid ethylene (which is the preferred refrigerant), or such other diluent-refrigerants as liquid methane, especially in admixture with liquid propane or liquid ethane, or external cooling may be used. In addition, various diluents may be used such as butane, ethyl or methyl chloride and the like. To this mixture of olefins and diluent-refrigerant, there is then added a solution of a Friedel-Crafts catalyst such as an active halide catalyst, for example, aluminum chloride, aluminum bromide, zirconium chloride, boron fluoride, titanium chloride, or uranium chloride dissolved in an inert, low-freezing, solvent such as a lower hydrocarbon or an alkyl halide or ethyl or methyl chloride or carbon disulfide or other similar low-freezing non-complex forming solvent. The catalyst solution is preferably applied to the rapidly stirred olefin-containing mixture, in finely dispersed form. The polymerization proceeds rapidly to yield a slurry or mass of the desired polymer in the residual diluent-refrigerant and unreacted monomers.

The polymerization reaction is preferably continued until from 10% to 70% of the total monomer reactants present have reacted. When this stage of reaction is reached, the reaction is desirably quenched by mixing the polymerization reaction mixture with a combined oxygen-containing substance such as an alcohol, a ketone or an acid, or an alkaline agent such as caustic or carbonate solution or ammonia or other similar quenching agent. The polymer is then brought up to room temperature and in so doing, the diluent, the refrigerant, the catalyst solvent, and the unreacted olefins are volatilized and any decomposition products of the active metal halide catalyst substance are removed by washing. The polymer is then isolated and dried, and is ready for the next step of the present invention.

The process for making isobutylene-butadiene copolymers having iodine numbers between 50 and 175 is described in more detail in Serial No. 788,640, filed November 28, 1947, now Patent 2,607,764. The process for making isobutylene-isoprene copolymers having iodine numbers between 55 and 175 is described more completely in Serial No. 218,701, filed March 31, 1951, now U. S. Patent 2,739,141.

The double cements are made up by compounding the required polymers into either sulfur or non-sulfur-containing recipes using a rubber mill for the blending operations. In formulating these cements, the following recipes are typical and were tested and found to be satisfactory for bonding isoolefin-diolefin copolymers to natural rubber and to butadiene-styrene copolymers as well as to mixtures thereof. Variations in the components of the recipes are possible, and in some cases, such variations may be desirable to achieve optimum results.

CEMENT RECIPES

| Component | Cement | | |
| --- | --- | --- | --- |
|  | A | B | C |
|  | Parts by Weight | | |
| Polymer | 100 | 100 | 100 |
| Zinc Oxide | 5 | 5 | 5 |
| Carbon Black | 50 | 50 | 50 |
| Sulfur | 5 |  |  |
| Tetramethylthiuram disulfide | 3 |  |  |
| p,p'-Dibenzo quinone dioxime |  | 6 |  |
| p-Quinone dioxime |  |  | 4 |
| Red Lead Oxide |  | 10 | 10 |

The compounded recipes can then be mixed with a solvent if desired which may be any solvent capable of dissolving or dispersing the rubbery polymer and the other components but which possesses at least some volatility properties. The straight chain and branched chain paraffin hydrocarbons have been found to be especially useful as solvents. Or a solvent such as benzene, toluene, or suitable chlorinated hydrocarbons may be used. Hexane is a good solvent which may be employed for preparing the cements of this invention. If other materials are used in the compounding recipe, such inorganic materials as zinc oxide and carbon black may be insoluble. In any case, a solution or a dispersion may be prepared and used. A mixture containing about 6 to 15% by weight of solids can be prepared. A cement with hexane as a solvent and having about 10% solids is preferred.

The rubber and copolymer formulations used in the preparation of adhesion test specimens are shown below. The isobutylene-isoprene copolymer was prepared by the generally known methods for making such copolymers and especially by the procedures as shown in U. S. Patent 2,356,128 to Thomas and Sparks using about 3 weight percent of isoprene in the polymerization feed. The procedure for making the butadiene-styrene copolymer rubber (GR–S) is well known to the art.

FORMULATIONS EMPLOYED IN ADHESION TESTING

| | Adhesion Pads—Parts by Weight | | |
|---|---|---|---|
| | Isobutylene-Isoprene copolymer | Butadiene-styrene copolymer | Natural Rubber Butadiene-styrene copolymer blend [1] |
| Polymer | 100 | 100 | 100 |
| Zinc Oxide | 5 | 5 | 5 |
| (SRF) Carbon Black | 15 | 20 | 20 |
| Stearic Acid | 0.5 | 1 | 1 |
| Furnace Black (fine particle) | 35 | 25 | 20 |
| Sulfur | 2 | 3 | 3 |
| Tetramethylthiuram disulfide | 1 | | |
| 2,2'-Benzothiazyl disulfide | | 1 | 1 |
| Petroleum Softener | 3 | 5 | 3 |
| Tellurium dithiocarbamate | 1 | | |
| Phenyl beta-naphthylamine | | 1 | 1 |

[1] A blend of 2 parts copolymer to 1 part natural rubber smoked sheet by weight.

From these compounds 4 x 6 pads were cut from the calendered sheets. One cement was applied to the surface of the green low unsaturation isoolefin-diolefin compound and another cement was applied to the high unsaturation rubbery compound. The cements were allowed to dry 15 minutes at room temperature. Then the cement coated surfaces of the different polymers were put together and rolled tightly together. A heavy cotton cloth was placed on the back of each polymer. These cemented pads were placed in a 4 x 6 mold and cured for 30 minutes at 300° F. After curing, the test pads were allowed to age at room temperature for 24 hours. Then 1 inch wide strips were cut from the cemented pads and separation was started at the end of the strip along the cemented interface. These ends were placed in the jaws of a Scott testing machine and pulled apart at the rate of 2 inches per minute. The pull required to effect separation of the polymers is the adhesion per linear inch.

Tests made according to the above description were carried out with a number of various polymers as the basic cement ingredient. In addition, tests were made using two cure recipes with each basic cement ingredient. Polymers applied to the low unsaturation surface in the form of cements ranged from 20 to 100 parts of isoprene per 100 parts of isobutylene by weight in the polymerization feed and polymers used as cements against the 33-67 natural rubber-GR-S blend were 400 to 750 parts of butadiene per 100 parts of isobutylene. These combinations give excellent results and in particular when non-sulfur type cement recipes were used. Cements of polymers prepared from mixtures containing from 100 to 400 parts of butadiene per 100 parts of isobutylene were also tested against the high unsaturation materials and found to be excellent when this double cement method was employed.

The application of double cements permits the construction of tires from a multiplicity of polymers which has heretofore been relatively unsuccessful because of poor bonds at the polymer interfaces. For example, a tire may be prepared with GR-S polymer compounds in the sidewall, carcass and breaker with an isoolefin-diolefin copolymer tread by the application of the inventors' double cement at the interface of the different polymers. Similarly, an isobutylene-diolefin copolymer sidewall tire can be constructed with a high unsaturation rubbery material in the other portions of the tire which would have superior sidewall cracking resistance over that of previously constructed tires. The use of these cements is not limited to only tire application since many polymer uses may require a multiple polymer construction for optimum usage. Therefore, these double cements which are easily made up and applied have a very useful application.

The invention will be more completely described by the following examples which are presented as representative embodiments of the invention but not with the intention of any limitation thereto.

Example 1

The polymers shown in Table 1 below were prepared via Friedel-Crafts catalyzed low temperature (−103 to −90° C.) polymerization of isobutylene and a diolefin in a diluent of methyl chloride. All polymers were prepared in a 6″ batch polymerization reactor with external ethylene refrigeration. After destroying excess catalyst with alcohol and recovering the polymer by vaporization of monomers and diluent with hot water, the polymers were hot milled to remove traces of monomer and water. In cases where the polymer was found to be extremely tough, the polymers were cold milled for about one-half hour prior to compounding to improve the smoothness of the final cement. Others were treated with 0.1 to 0.2% by weight of 36.5% xylyl mercaptan in an inert hydrocarbon media. The copolymers treated or untreated were compounded on a cold mill. Recipes used represent general types of curing methods, one the sulfur type cure, and the other two representing a non-sulfur type cure. These recipes are shown above. Other recipes have been tried and found to be effective cement formulations with these polymers.

After compounding, the green compounds were placed in cans and sufficient hexane added to make a dispersion of about 10% solids. Then the cans and contents were shaken until a smooth cement was formed, which usually was accomplished by shaking overnight or for about 16 hours.

TABLE 1.—PREPARATION OF ISOBUTYLENE-BUTADIENE AND ISOBUTYLENE-ISOPRENE COPOLYMERS

| Polymer Number | Feed, cc. | | | | Designation (pts. by wt. of diolefin/100 pts. by wt. of isobutylene) | Catalyst | | Percent Conv. Based on Total Monomers |
|---|---|---|---|---|---|---|---|---|
| | Methyl Chloride Diluent | Isobutylene | Isoprene (B) | Butadiene (A) | | Conc., g. $AlCl_3$/100 cc. MeCl | Eff., g. polymer/g. catalyst | |
| 1 | 2,400 | 1,200 | 223 | None | B-20 | 0.46 | 730 | 47.0 |
| 2 | 1,700 | 850 | 238 | None | B-30 | 0.26 | 196 | 24.1 |
| 3 | 1,730 | 865 | 403 | None | B-50 | 0.26 | 110 | 17.3 |
| 4 | 1,500 | 750 | 697 | None | B-100 | 0.26 | 54 | 12.3 |
| 5 | 1,050 | 700 | None | 1,400 | A-200 | 0.25 | 106 | 12.1 |
| 6 | 1,800 | 450 | None | 1,800 | A-400 | 0.58 | 76 | 14.9 |
| 7 | 800 | 400 | None | 2,000 | A-500 | 0.47 | 171 | 35.9 |
| 8 | 450 | 450 | None | 2,250 | A-500 | 0.25 | 45 | 7.7 |
| 9 | 1,500 | 300 | None | 2,250 | A-750 | 0.58 | 52 | 9.6 |

Data obtained from a study of the physical properties of the polymers of Table 1 are shown in Table 2 below.

TABLE 2

| Polymer Number | Percent Gel | $I_2$ No. (Drastic $I_2$-Hg Acetate) | $I_2$ No. (I Cl.) (Wijs Method) | Mooney Viscosity @ 212°F., 1½′-8′ |
|---|---|---|---|---|
| 1 | 4.6 | 54.7 | 68.7 | 62-59 |
| 2 | 0.15 | 69.9 | 90.0 | |
| 3 | 56.5 | 45.6 | 57.2 | |
| 4 | 73.4 | 41.1 | 51.6 | |
| 5 | 39.7 | 52.8 | 68.0 | 88-86 |
| 6 | 85.6 | 38.2 | 49.3 | 90-80 |
| 7 | 98.7 | 24.2 | 31.2 | 75-68 |
| 8 | 76.6 | 66.8 | 86.0 | 75-69 |
| 9 | 78.3 | 68.6 | 88.5 | 100-87 |

Example II

Table 3 shows results obtained when the polymers prepared as described in Example I were used to prepare double cements. These double cements were tested for their ability to adhere pads of low-unsaturation isobutylene-diolefin copolymers to pads of more highly unsaturated polymeric materials. These novel double cements proved to be quite satisfactory in producing strong bonds. The cement prepared from a commercial polymer of isobutylene-isoprene copolymer (B-3) was unsatisfactory even when used with the A-500 cement applied to GR-S (butadiene-styrene copolymer) stock.

TABLE 3

| Test No. | Cement Applied to Isobutylene-diolefin Copolymer Pad | | Cement Applied to Natural GR-S Blend Pad | | Adhesion, Lbs. per Linear Inch | |
|---|---|---|---|---|---|---|
| | Polymer Number | Designation | Polymer Number | Designation | Curing Recipe A | Curing Recipe C |
| I | 2 | B-30 | 5 | A-200 | 16 | |
| II | 3 | B-50 | 5 | A-200 | 17 | |
| III | 1 | B-20 | 6 | A-400 | 24 | 47 |
| IV | 2 | B-30 | 6 | A-400 | 20 | 47 |
| V | 3 | B-50 | 6 | A-400 | 22 | 37 |
| VI | 4 | B-100 | 6 | A-400 | 22 | 33 |
| VII | GR-I* | B-3 | 7 | A-500 | 7 | |
| VIII | 1 | B-20 | 7 | A-500 | 14 | 32 |
| IX | 2 | B-30 | 7 | A-500 | 21 | 45 |
| X | 3 | B-50 | 7 | A-500 | 18 | 24 |
| XI | 4 | B-100 | 7 | A-500 | 15 | 26 |
| XII | 1 | B-20 | 9 | A-750 | 18 | |
| XIII | 2 | B-30 | 9 | A-750 | 17 | |
| XIV | 3 | B-50 | 9 | A-750 | 26 | |
| XV | 4 | B-100 | 9 | A-750 | 20 | |

*Standard isobutylene-isoprene copolymer.

Example III

The prior Examples I and II were carried out using a 33-67% natural rubber-GR-S blend as the test compound for adhering to low unsaturation isobutylene-diolefin copolymer. Tests were also carried out as previously described with GR-S compound test pads.

The results are shown in Table 4, tests XVI and XVII. These tests show that the novel double cements provided bonds between the two unlike polymers which are even superior to the bonds formed with the blend stock pads.

TABLE 4

| Test No. | Cement Applied to Isobutylene-diolefin Copolymer Pad | | Cement Applied to GR-S Pad | | Adhesion, Lbs. per Linear Inch | |
|---|---|---|---|---|---|---|
| | Polymer Number | Designation | Polymer Number | Designation | Curing Recipe A | Curing Recipe C |
| XVI | 1 | B-20 | 8 | A-500 | 29 | 46 |
| XVII | 2 | B-30 | 8 | A-500 | 27 | |

Example IV

To show that both cements used on the different polymer pads need not have the same basic recipe, cements were applied to the pads of unlike polymers of Example III which had different recipes. Polymer 1 (B-20) made up in recipe A (sulfur recipe) was applied to isobutylene-isoprene copolymer test pad. Polymer 8 (A-500) made up in recipe C (non-sulfur) was applied to GR-S. After curing, resting and then pulling, the bond obtained by this combination was 50 lbs. per linear inch at which time ripping occurred through the test pad and cloth rather than tearing along the bonded surface.

Example V

A copolymer of isobutylene-dimethylbutadiene was prepared in the same manner as other polymers used in preparing the invention cements, for instance, as described in Example I. This D-50 polymer (50 parts dimethylbutadiene per 100 parts of isobutylene by weight in the reactant feed) was then made into a recipe C cement according to methods previously described. This cement was applied to the standard isobutylene-isoprene copolymer pad while an A-500 in a recipe C cement was applied to GR-S. After the usual preparation and curing, a bond of 35 lbs. per linear inch was obtained. This is superior to the bond obtained with a similar double cement (test No. X) using B-50 (butadiene-isobutylene copolymer) against the standard isobutylene-isoprene copolymer.

Example VI

Other double cements than those previously shown were found to have bonds superior to those of cements prepared from commercial polymers but inferior to the previous cements described by the inventors. In this case polymer 5 (A-200) in a recipe C cement was applied to the standard isobutylene-isoprene copolymer surface and polymer 4 (B-100) in a recipe C cement was applied to GR-S. This bond had a strength of 22 lbs. per linear inch.

Example VII

Polymers described above were converted into cements and tested as single cement applications to show that all polymers do not alone produce bonds as great as the invention double cements. In this example the same cement was applied to both the standard isobutylene-isoprene copolymer and to the GR-S surface. After following the standard procedure, the data in Table 5 were obtained.

TABLE 5

| Test No. | Cement Applied to Isobutylene-isoprene Copolymer and to GR-S Pads | | Adhesion, lbs. per linear inch | |
|---|---|---|---|---|
| | Polymer Number | Designation | Recipe A | Recipe C |
| XVIII | 2 | B-30 | 7 | 13 |
| XIX | 3 | B-50 | 9 | 15 |
| XX | 4 | B-100 | 6 | |

Example VIII

A second series of polymers was prepared from co-reactants isobutylene and dimethyl-butadiene according to the procedure of Example I. The bonds obtained after application as a single cement are shown in Table 6.

TABLE 6

| Test No. | Cement Applied to Isobutylene-isoprene Copolymer and GR-S Pads | | Initial Adhesion, Lbs. per Linear Inch | |
|---|---|---|---|---|
| | Polymer Number | Designation | Recipe A | Recipe C |
| XXI | 10 | D-30 | [1] 6 | [1] 9 |
| XXII | 11 | D-50 | [1] 8 | [1] 11 |
| XXIII | 12 | D-75 | [1] 13 | [1] 16 |
| XXIV | 13 | D-100 | [1] 16 | [1] 19 |

[1] Skate—low adhesion on rapid pull.

The above Examples VII and VIII show that in single cement application poor bonds are formed and they exhibit the very undesirable phenomenon known in the art as skating. Skating is a condition where some adhesion is shown at the onset of separation and then the bond separates very easily at much lower adhesions while separation continues along the bond. The above adhesions are the initial high values before skating occurs. Therefore, these single cements are very poor because of low adhesions and also because the bonds separate easily once separation has started.

Example IX

These cements of the same polymers and recipes as shown in Example VIII were applied as double cements to show that the invention double cements do not give adequate bonds with all polymers. In this application the lower diolefin content polymer as a cement was applied to the low unsaturation isobutylene-isoprene copolymer and the higher unsaturation polymer as a cement was applied to GR-S. Results after standard method of preparation and testing are shown in Table 7.

TABLE 7

| Test No. | Cement Applied to Isobutylene-isoprene Pad | | Cement Applied to GRS-Pad | | Initial Adhesion, Lbs./Linear Inch | |
|---|---|---|---|---|---|---|
| | Polymer Number | Designation | Polymer Number | Designation | Recipe A | Recipe C |
| XXV | 11 | D-50 | 13 | D-100 | ¹17 | ¹23 |
| XXVI | 11 | D-50 | 12 | D-75 | -------- | ¹15 |

¹ Skate—low adhesion on rapid pull.

These results show that the double cement or grading unsaturation of cement polymers increases the adhesions over simple cements but the separation skates after initial pulling.

Example X

A series of isobutylene-butadiene copolymers was prepared by the same general method described in Example I. Details of the preparation are shown in Table 8. The physical properties of the copolymers are shown in Table 9.

Example XI

This is an example of the double cements where the polymer for the cement preparation is obtained from copolymers of isobutylene and isoprene. Here the lower diolefin content copolymer (low unsaturation) was applied to the standard isobutylene-diolefin copolymer in the form of a cement and the higher diolefin copolymer was applied to the GR-S in the form of a cement. Data are tabulated in Table 10. In this example the invention double cements show greatly improved bond strengths over single cements from the same polymers when used for the same type bonds. Adhesions of 20 to 37 lbs. per linear inch are obtained with the "graded" polymers in recipe C cement, and the bonds are non-skating.

TABLE 10

| Test No. | Cement Applied to Isobutylene-diolefin Copolymer Pad | | Cement Applied to Natural GR-S Blend Pad | | Adhesion, Lbs. per Linear Inch | |
|---|---|---|---|---|---|---|
| | Polymer Number | Designation | Polymer Number | Designation | Curing Recipe A | Curing Recipe C |
| XXVII | GR-I* | B-3 | 2 | B-30 | -------- | 17 |
| XXVIII | GR-I* | B-3 | 3 | B-50 | -------- | 35 |
| XXIX | GR-I* | B-3 | 4 | B-100 | -------- | 18 |
| XXX | 1 | B-20 | 2 | B-30 | -------- | 21 |
| XXXI | 1 | B-20 | 3 | B-50 | -------- | 24 |
| XXXII | 1 | B-20 | 4 | B-100 | -------- | 29 |
| XXXIII | 2 | B-30 | 3 | B-50 | -------- | 24 |
| XXXIV | 2 | B-30 | 4 | B-100 | 13 | 37 |

*Standard 97% isobutylene-3% isoprene copolymer.

Example XII

The best cements which give excellent bonds were prepared from isobutylene-butadiene copolymers. The lower diolefin polymer was applied to the green GR-I compound and the higher diolefin copolymer was applied to the GR-S compound. Combinations and the results are shown in Table 11. The bonds obtained were substantially the same for both recipe A and recipe C cements. The adhesions were good with the graded double cements with values of 20 to 37 lbs. per linear inch. Optimum results were obtained with A-100 to A-200 as cements applied to isobutylene-diolefin copolymer and A-400 to A-750 as cements applied to GR-S.

TABLE 8.—PREPARATION OF ISOBUTYLENE-BUTADIENE COPOLYMERS

| Polymer Number | Feed cc. | | | | Catalyst | | Percent Conv. Based on Total Monomers |
|---|---|---|---|---|---|---|---|
| | Methyl Chloride Diluent | Isobutylene | Butadiene | Designation (pts. by wt. of diolefin/100 pts. by wt. of isobutylene) | Conc., g. AlCl₃/100 cc. MeCl | Eff. g. polymer/g. catalyst | |
| 14 | 2,400 | 800 | 400 | A-50 | 0.46 | 910 | 45.5 |
| 15 | 1,800 | 800 | 800 | A-100 | 0.46 | 240 | 44.2 |
| 16 | 1,050 | 700 | 1,400 | A-200 | 0.25 | 106 | 12.1 |
| 17 | 1,000 | 500 | 2,000 | A-400 | 0.49 | 60 | 17.2 |
| 18 | 200 | 400 | 3,000 | A-750 | 0.25 | 132 | 18.8 |

TABLE 9

| Polymer Number | Percent Gel | I₂ No. (Drastic I₂-Hg Acetate) | I₂ No. (I Cl.) (Wijs Method) | Mooney Viscosity @ 212° F., 1½'-8' |
|---|---|---|---|---|
| 14 | 0.0 | 17.4 | 24.4 | 59-54 |
| 15 | 16.3 | 38.5 | 49.6 | 97-98 |
| 16 | 39.7 | 52.8 | 68.0 | 88-86 |
| 17 | 86.9 | 34.2 | 44.1 | 69-60 |
| 18 | 92.0 | 45.0 | 58.0 | 75-66 |

TABLE 11

| Test No. | Cement Applied to Isobutylene-diolefin Copolymer Pad | | Cement Applied to GR-S Pad | | Adhesion, Lbs. per Linear Inch | |
|---|---|---|---|---|---|---|
| | Polymer Number | Designation | Polymer Number | Designation | Curing Recipe A | Curing Recipe C |
| XXXV | 14 | A-50 | 17 | A-400 | 11 | 10 |
| XXXVI | 15 | A-100 | 17 | A-400 | 20 | 24 |
| XXXVII | 16 | A-200 | 17 | A-400 | 26 | 26 |
| XXXVIII | 17 | A-400 | 17 | A-400 | 13 | 14 |
| XXXIX | 8 | A-500 | 17 | A-400 | 14 | 25 |
| XL | 18 | A-750 | 17 | A-400 | 10 | 11 |
| XLI | 14 | A-50 | 8 | A-500 | 10 | 10 |
| XLII | 15 | A-100 | 8 | A-500 | 22 | 23 |
| XLIII | 16 | A-200 | 8 | A-500 | 33 | 37 |
| XLIV | 17 | A-400 | 8 | A-500 | 18 | 21 |
| XLV | 8 | A-500 | 8 | A-500 | 16 | 28 |
| XLVI | 18 | A-750 | 8 | A-500 | 11 | 16 |
| XLVII | 14 | A-50 | 18 | A-750 | 7 | -------- |
| XLVIII | 15 | A-100 | 18 | A-750 | 16 | -------- |
| XLIX | 16 | A-200 | 18 | A-750 | 17 | -------- |
| L | 17 | A-400 | 18 | A-750 | 13 | -------- |
| LI | 8 | A-500 | 18 | A-750 | 17 | -------- |
| LII | 18 | A-750 | 18 | A-750 | 11 | -------- |

Example XIII

Data similar to that of Example XII are shown with bonds between low unsaturation isobutylene-diolefin copolymer and a 33%–67% natural rubber-GR-S blend respectively. In this case optimum bonds were obtained with A-100 to A-400 on the isobutylene-diolefin copolymer side and A-500 on the GR-S-natural rubber side. The details are shown in Table 12.

TABLE 12

| Test No. | Cement Applied to Isobutylene-diolefin Copolymer Pad | | Cement Applied to Natural Rubber-GR-S Blend Pad | | Adhesion, lbs./linear inch for Receipt C Cements |
|---|---|---|---|---|---|
| | Polymer Number | Designation | Polymer Number | Designation | |
| LIII | 14 | A-50 | 8 | A-500 | 10 |
| LIV | 15 | A-100 | 8 | A-500 | 20 |
| LV | 16 | A-200 | 8 | A-500 | 28 |
| LVI | 17 | A-400 | 8 | A-500 | 21 |
| LVII | 8 | A-500 | 8 | A-500 | 19 |
| LVIII | 18 | A-600 | 8 | A-500 | 14 |

*Example XIV*

In addition to the vulcanizing agents used in recipes A, B and C, cements have also been prepared by the recipe as shown below and in Table 13. These were tested and found to provide excellent bonds between a 33%–67% natural rubber-GR-S blend and isobutylene-diolefin copolymers.

CEMENT RECIPES

| Component | Cement | | |
|---|---|---|---|
| | D | E | F |
| | Parts by Weight | | |
| Polymer | 100 | 100 | 100 |
| Zinc Oxide | 5 | 5 | 5 |
| Carbon Black | 50 | 50 | 50 |
| Sulfur | 3 | 3 | |
| Tetramethylthiuram disulfide | 0.1 | 0.5 | |
| Benzothiazyl disulfide | 1.0 | | |
| p-Quinone dioxime | | | 3 |
| Red Lead Oxide | | | 10 |
| Cement Solids: 10% in hexane. | | | |

TABLE 13

| Test No. | Cement Applied to Isobutylene-diolefin Copolymer Pad | | Cement Applied to Natural Rubber-GR-S Blend Pad | | Adhesion, lbs./linear inch |
|---|---|---|---|---|---|
| | Polymer Number | Recipe | Polymer Number | Recipe | |
| LIX | 1 | D | 8 | D | 50 |
| LX | 1 | E | 8 | E | 30 |
| LXI | 1 | F | 8 | F | 32 |

The curatives employed in these cements for bonding low unsaturation isobutylene-diolefin copolymer to high diolefin rubbers can be adjusted to meet the vulcanization requirements of the compounds employed.

*Example XV*

The use of this invention makes possible the construction of a pneumatic tire by bonding together rubbery materials of high and low levels of chemical unsaturation. The tire carcass or casing may be prepared in conventional manner by impregnating and/or calendering natural or synthetic fibers, or even metal wire, with high unsaturation rubbers containing normal constituents such as sulfur, vulcanizing accelerators, fillers, reclaimed rubber, softeners, etc. To this carcass or cushion is applied the appropriate portion of the double cement as described in the above examples.

The tread and sidewall can be prepared for tire building by extrusion or calendering operations according to techniques well known in the art from a low unsaturation rubber prepared predominantly from isobutylene and a conjugated diolefin such as isoprene or butadiene, also containing normal constituents, curatives, softener, filler, etc. The surface of the isobutylene-diolefin copolymer, which contact the tire carcass or casing prepared from high unsaturation rubbers, as shown in the above examples, may be coated with the other portion of the double cement. The two surfaces bearing the two appropriate portions of the double cement are then joined during the tire assembly. The assembled tires may then be vulcanized in customary manner.

*Example XVI*

Alternatively, the invention may be utilized for the assembling and joining together various structures having jackets or covering made up of the low unsaturation isobutylene-diolefin copolymer material which is highly resistant to oxidation by ozone, air or other reactants and highly resistant to sunlight, ultra-violet light and heat, as well as highly resistant to flexure, abrasion, and other mechanically destructive influences. Articles in which this type of structure is particularly advantageous are pneumatic tires as above described; cables in which an insulation of natural rubber, either new or reclaimed, is protected by a jacket of the copolymer held in place by intervening layers of the novel double tie gum; belts either for the transmission of power or conveyor belts, in which a fabric carcass impregnated with rubber is protected by a bonded jacket of polymer in which instance the combination is particularly advantageous because of the high strength and high abrasion resistance of the polymer.

What is claimed is:

1. An article of manufacture comprising a first body of a low temperature interpolymer of a major amount of isobutylene with a minor proportion of a conjugated diolefin, the interpolymer being characterized by a low unsaturation within the range of a Wijs iodine number between about 0.5 and 50, a molecular weight above about 20,000 and reactivity with a curing agent to yield an elastic product, a layer of interpolymer adherent thereto as a cement, said cement interpolymer having a Wijs iodine number above about 50 and having been prepared from an olefinic feed mixture having about 20 to 100 parts of diolefin having from about 4 to 6 carbon atoms per 100 parts of an isoolefin; and a second body of a high unsaturation rubbery material, characterized by a Wijs iodine number of up to about 451 but higher than said first-named iodine number, and being reactive with a curing agent, a layer of interpolymer adherent thereto as a cement, said cement interpolymer being prepared from an olefinic feed mixture having about 400 to 750 parts of butadiene per 100 parts of isobutylene, said first and second bodies being cemented together by a bond consisting of said two cement layers adhered directly together.

2. An article of manufacture comprising a first body of a low temperature interpolymer of a major amount of isobutylene with a minor proportion of a conjugated diolefin, the interpolymer being characterized by a low unsaturation within the range of a Wijs iodine number between about 0.5 and 50, a molecular weight above about 20,000 and reactivity with a curing agent to yield an elastic product, a layer of interpolymer adherent thereto as a cement, said cement interpolymer having a Wijs iodine number of about 55 to 175 prepared from an olefinic feed mixture having about 20 to 100 parts of isoprene per 100 parts of isobutylene; and a second body of a high unsaturation rubbery material characterized by a Wijs iodine number of up to about 451 but higher than said first-named iodine number, and being reactive with a curing agent, a layer of interpolymer adherent thereto as a cement, said cement interpolymer prepared from an olefinic feed mixture having about 400 to 750 parts of butadiene per 100 parts of isobutylene, said first and second bodies being cemented together by a bond consisting of said two cement layers adhered directly together, the two cement interpolymers being graded so that the one next to the low unsaturation isobutylene diolefin rubber has a lower iodine number than the cement interpolymer adhered to the high unsaturation rubber.

3. An article of manufacture comprising a first body of a low temperature interpolymer of a major amount of isobutylene with a minor proportion of a conjugated diolefin, the interpolymer being characterized by a low unsaturation within the range of a Wijs iodine number between about 0.5 and 50, a molecular weight above about 20,000 and reactivity with a curing agent to yield an elastic product, a layer of interpolymer adherent thereto as a cement, said cement interpolymer having a Wijs iodine number of about 50 to 175 prepared from an olefinic feed mixture having about 30 to 100 parts of dimethyl butadiene per 100 parts of isobutylene; and a second body of a high unsaturation rubbery material, characterized by a Wijs iodine number of up to about 451 but higher than said first-named iodine number, and being reactive with a curing agent, a layer of interpolymer adherent thereto as a cement, said cement interpolymer having a Wijs iodine number of about 50 to 175 prepared from an olefinic feed mixture having about 400 to 750 parts of butadiene per 100 parts of isobutylene, said first and second bodies being cemented together by a bond consisting of said two cement layers adhered directly together, the cement interpolymer adhered to the low unsaturation isobutylene diolefin rubber having a lower iodine number than the cement interpolymer adhered to the high unsaturation rubber.

4. An article of manufacture comprising a first body of a low temperature interpolymer of a major amount of isobutylene with a minor proportion of a conjugated diolefin, the interpolymer being characterized by a low unsaturation within the range of a Wijs iodine number between about 0.5 and 50, a molecular weight above about 20,000 and reactivity with a curing agent to yield an elastic product, a layer of interpolymer adherent thereto as a cement, said cement interpolymer having a Wijs iodine number of about 24 to 68 prepared from an olefinic feed mixture having about 50 to 200 parts of butadiene per 100 parts of isobutylene; and a second body of a high unsaturation rubbery material characterized by a Wijs iodine number of up to about 451 but higher than said first-named iodine number, and being reactive with a curing agent, a layer of interpolymer adherent thereto as a cement, said cement interpolymer having a Wijs iodine number of about 50 to 175 prepared from an olefinic feed mixture having about 400 to 750 parts of butadiene per 100 parts of isobutylene, said first and second bodies being cemented together by a bond consisting of said two cement layers adhered directly together, the iodine number of the cement interpolymer adherent to the low unsaturation isobutylene-diolefin synthetic rubber being lower than that of the cement interpolymer adherent to the high unsaturation rubber.

5. A method of uniting a vulcanizable solid isoolefin-diolefin interpolymer material, prepared by reacting together a major proportion of isobutylene and a minor proportion of a conjugated diolefin having from about 5 to 8 carbon atoms, in the presence of a dissolved Friedel-Crafts catalyst, at a temperature between about 0° C. and —160° C., said interpolymer having a Wijs iodine number below about 50, and a molecular weight greater than 20,000, to a high unsaturation, rubbery material having a Wijs iodine number of up to about 451 but higher than said first-named iodine number, which comprises placing an adherent cement coating of an interpolymer prepared from an olefinic feed mixture having about 20 to 100 parts of a diolefin having from about 4 to 6 carbon atoms per 100 parts of isobutylene on the isoolefin-diolefin interpolymer material, placing an adherent cement coating of an interpolymer prepared from an olefinic feed mixture having about 400 to 750 parts of butadiene per 100 parts of isobutylene on the high unsaturation rubbery material, the former cement having a lower iodine number than the latter cement, and cementing together the isoolefin-diolefin interpolymer and the high unsaturation rubbery material with a bond consisting of said two cement coatings by placing said coatings face to face in touching adjacent relationship and curing the laminated structure formed to produce a firm, adherent bond.

6. An article of manufacture according to claim 1 in which the said second body is a diene-styrene interpolymer.

7. An article of manufacture according to claim 1 in which the said second body is a blend of a diene-styrene interpolymer and natural rubber.

8. An article of manufacture according to claim 1 in which the said first body is an interpolymer of about 97 weight percent of isobutylene and about 3 weight percent of isoprene.

9. The method according to claim 5 in which the high unsaturation rubbery material is a diene-styrene interpolymer.

10. The method according to claim 5 in which the high unsaturation rubbery material is a blend of a diene-styrene interpolymer and natural rubber.

11. The method according to claim 5 in which the interpolymer material is a copolymer of about 97 weight percent of isobutylene and about 3 weight percent of isoprene.

12. A method according to claim 5 in which the isoolefin-diolefin interpolymer material, the high unsaturation, rubbery material, and the two cement coatings placed thereon are compounded with curatives and the united materials are subsequently subjected to a curing treatment to vulcanize the interpolymer material, the high unsaturation rubbery material, and the cements.

References Cited in the file of this patent

UNITED STATES PATENTS

| | | |
|---|---|---|
| 2,399,558 | McArdle et al. | Apr. 30, 1946 |
| 2,405,943 | Doering et al. | Aug. 20, 1946 |
| 2,418,025 | Garvey | Mar. 25, 1947 |
| 2,471,905 | Smith | May 31, 1949 |
| 2,575,249 | Connell et al. | Nov. 13, 1951 |
| 2,583,387 | Morrissey et al. | Jan. 22, 1952 |
| 2,631,953 | Hubbard et al. | Mar. 17, 1953 |
| 2,701,221 | Clayton et al. | Feb. 1, 1955 |

FOREIGN PATENTS

| | | |
|---|---|---|
| 112,875 | Australia | Apr. 24, 1941 |